United States Patent
Yang (10) Patent No.: US 11,736,884 B2
(45) Date of Patent: Aug. 22, 2023

(54) METHOD AND SYSTEM FOR PREVENTING MULTI-CONVERSATION MODE FOR VEHICLES

(71) Applicants: HYUNDAI MOTOR COMPANY, Seoul (KR); KIA MOTORS CORPORATION, Seoul (KR)

(72) Inventor: Woo Sok Yang, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 17/097,370

(22) Filed: Nov. 13, 2020

(65) Prior Publication Data
US 2021/0409890 A1    Dec. 30, 2021

(30) Foreign Application Priority Data

Jun. 25, 2020    (KR) .......................... 10-2020-0077827

(51) Int. Cl.
*H04S 7/00*    (2006.01)
*G10L 15/22*    (2006.01)

(52) U.S. Cl.
CPC .............. *H04S 7/302* (2013.01); *G10L 15/22* (2013.01)

(58) Field of Classification Search
CPC ................. B60R 16/0373; G10L 15/22; G10L 2015/225; G10L 17/00; H04M 3/56; H04M 3/568; H04R 1/323; H04R 2499/13; H04S 7/00; H04S 7/30; H04S 7/302; H04S 7/303
USPC ................................................... 381/302, 303
See application file for complete search history.

(56) References Cited

U.S. PATENT DOCUMENTS

| | | | | |
|---|---|---|---|---|
| 5,020,098 | A * | 5/1991 | Celli | H04M 3/561 381/1 |
| 2009/0080632 | A1* | 3/2009 | Zhang | H04M 3/56 379/202.01 |
| 2017/0353811 | A1* | 12/2017 | Mcgibney | H04S 7/303 |
| 2019/0214003 | A1* | 7/2019 | Kobayashi | G01S 3/802 |
| 2020/0137509 | A1* | 4/2020 | Stanek | H04S 7/303 |

FOREIGN PATENT DOCUMENTS

JP    2006-194633 A    7/2006

* cited by examiner

*Primary Examiner* — Harry S Hong
(74) *Attorney, Agent, or Firm* — Morgan, Lewis & Bockius LLP (57) ABSTRACT

A method for supporting a multi-conversation mode for a vehicle of the present disclosure may include: receiving user information of the multi-conversation mode and at least one of a message or speech from a conversation partner participating in the multi-conversation mode; allocating sound spaces on the basis of the user information; and assigning directivity to speech generated on the basis of at least one of the message or the speech and outputting the speech to an allocated space.

19 Claims, 5 Drawing Sheets

Arrange in message order at distances (a)

METHOD AND SYSTEM FOR PREVENTING MULTI-CONVERSATION MODE FOR VEHICLES

This application claims the benefit of Korean Patent Application No. 10-2020-0077827, filed on Jun. 25, 2020, which is hereby incorporated by reference as if fully set forth herein.

TECHNICAL FIELD

The present disclosure relates to a method and system for supporting a multi-conversation mode for a vehicle.

BACKGROUND

In general, a speech recognition device used for a vehicle allows conference calling using a multi-conversation mode as well as 1:1 conversion and also allows multiple users to transmit/receive text through a messenger application.

However, in a conventional speech recognition device, when a user in a driver's seat calls a speech recognition system and initiates a conference call, speech is output without distinguishing users when speech with respect to text is output through a messenger application between multiple users during driving, and thus users cannot be easily recognized during a conference call.

SUMMARY

An object of the present disclosure is to provide a method and system for supporting a multi-conversation mode for a vehicle, which provide a function of easily recognizing a conversation partner by outputting sound having directivity through a surround sound function and a sound directivity function during a voice call between multiple users.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a method for supporting a multi-conversation mode for a vehicle may include: receiving user information of the multi-conversation mode and at least one of a message or speech from a conversation partner participating in the multi-conversation mode; allocating sound spaces on the basis of the user information; and assigning directivity to speech generated on the basis of at least one of the message or the speech and outputting the speech to an allocated space.

According to an embodiment, the user information may include at least one of the number, sexes, ages, IDs or names of conversation partners.

According to an embodiment, the allocating of sound spaces on the basis of the user information may include allocating sound spaces in response to the number of conversation partners.

According to an embodiment, the method may further include: grouping conversation partners on the basis of the user information when the number of conversation partners is greater than the number of allocated spaces; and allocating the generated groups to the sound spaces.

According to an embodiment, the assigning of directivity to speech and outputting the speech to an allocated space may include: arranging a conversation partner corresponding to the message in a farthest space from among the allocated spaces on the basis of message reception order; and assigning directivity to speech corresponding to the message received from the conversation partner and outputting the speech.

According to an embodiment, the assigning of directivity to speech corresponding to the message received from the conversation partner and outputting the speech may include: setting a predetermined speech output time to the allocated spaces; determining whether output of the speech corresponding to the received message is within the predetermined speech output time; when speech output is not within the predetermined speech output time, excluding special characters and modifiers from the message and determining whether output of the message from which the special characters and modifiers have been excluded as speech is within the predetermined speech output time; when output of the message from which the special characters and modifiers have been excluded as speech is not within the predetermined speech output time, controlling a speech output speed such that the speech output speed becomes a predetermined value and determining whether speech output is within the predetermined speech output time; and when speech output according to the speech output speed control is not within the predetermined speech output time, controlling the message such that the message is output to sound spaces in an overlapping manner.

According to an embodiment, the determining of whether output of the speech corresponding to the received message is within the predetermined speech output time may include determining whether the number of sentences of the received message is equal to or greater than a predetermined value when speech output is not within the predetermined speech output time, and dividing a speech output interval when the number of sentences is equal to or greater than the predetermined value.

According to an embodiment, the method may further include: determining a face direction of a driver through a camera at a time when the driver speaks; determining whether the face direction of the driver is consistent with the directivity of sound; and recognizing a conversation partner corresponding to the corresponding sound space when the face direction of the driver is consistent with the directivity of sound.

According to an embodiment, the method may further include: receiving speech of the driver when the driver speaks to the conversation partner; and transmitting a message or speech of the driver to the conversation partner.

According to the method and system for supporting a multi-conversation mode for a vehicle according to the present disclosure, a conversation partner can be easily recognized and a specific partner can be selected for a conversation in the multi-conversation mode.

In addition, text transmitted from multiple users is converted into speech corresponding to the respective users or assigned directivity such that a user who listens to the speech can easily recognize the users who sent the text in the multi-conversation mode.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Hereinafter, a device and various methods to which embodiments of the present disclosure are applied will be described in more detail with reference to the drawings. Throughout the specification, the terms "module" and "part" are used for convenience of description and thus can be used interchangeably and do not have any distinguishable meanings or functions.

In description of embodiments, it will be understood that, when an element is referred to as being "on" or "under" and "before" or "after" another element, the element can be directly on another element or intervening elements may be present.

It will be understood that, although the terms first, second, A, B, (a), (b), etc. may be used herein to describe various elements of the present disclosure, these terms are only used to distinguish one element from another element and order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In addition, terms like "include", "comprise", and "have" should be interpreted by default as inclusive or open rather than exclusive or closed unless expressly defined to the contrary. All terms that are technical, scientific or otherwise agree with the meanings as understood by a person skilled in the art unless defined to the contrary. Common terms as found in dictionaries should be interpreted in the context of the related technical writings not too ideally or impractically unless this disclosure expressly defines them so.

Figure 1A:
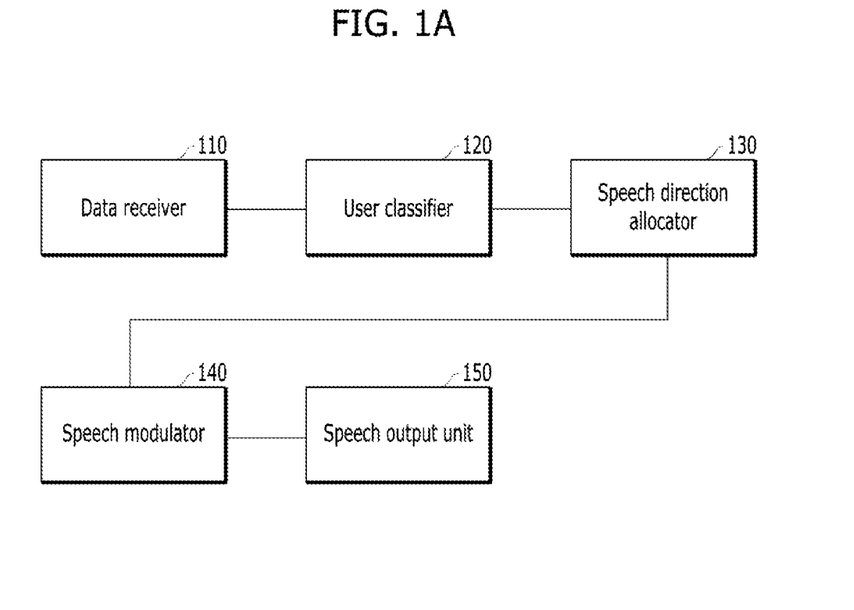
FIG. 1A is a block diagram of a system for supporting a multi-conversation mode for a vehicle according to an embodiment of the present disclosure.

FIG. 1A is a block diagram of a system for supporting a multi-conversation mode for a vehicle according to an embodiment of the present disclosure.

Referring to FIG. 1A, the system for supporting the multi-conversation mode for a vehicle may include a data receiver 110, a user classifier 120, a speech direction allocator 130, a speech modulator 140, and a speech output unit 150.

The data receiver 110 may receive at least one of a message and speech from a conversation partner through a messenger application for realizing the multi-conversation mode. The data receiver 110 may receive speech of conversation partners during multiple conversations through telephone calls. The data receiver 110 may receive messages from conversation partners during multiple conversations. The data receiver 110 may receive user information of the multi-conversation mode. In one example, the data receiver 110 may include an antenna or a transceiver configured to perform wireless/wired communication to receive data from a server or an external device such as a mobile device including a mobile phone.

The user classifier 120 may classify conversation partners who output messages through circuit or protocol analysis. Accordingly, the user classifier 120 may classify users on the basis of user information obtained from a telephone number/conversation message protocol. Here, the user information may include at least one of the number, sexes, ages, IDs and names of conversation partners.

The speech direction allocator 130 may allocate sound spaces on the basis of the user information.

To this end, the speech direction allocator 130 may divide a sound space in response to users classified by the user classifier 120. Then, the speech direction allocator 130 may allocate directions in response to the classified users.

When speech corresponding to text is output, the speech modulator 140 may modulate the speech such that the speech corresponds to a male/female voice or voice of the age of the corresponding user using user information and output the modulated speech such that a conversation partner can be easily recognized. To this end, the speech modulator 140 can be used for speech modulation suitable for speech output using the user information in the case of text. ON/OFF may be optionally set to the speech modulator 140.

The speech output unit 150 may output speech having directivity to allocated spaces.

The speech output unit 150 may assign directivity to speech generated on the basis of at least one of a message and speech received from the data receiver 110 and output the speech with directivity to a space allocated by the speech direction allocator 130. In one example, the speech output unit 150 may include one or more speakers. The speech output unit 150 may be configured to adjust, for example, respective volume of the one or more speakers, based on, for example, directivity to a space allocated by the speech direction allocator 130.

Here, speech may be output such that a direction in which speech of a conversation partner is output corresponds to a direction of a sound space allocated by the speech direction allocator 130.

Figure 1B:
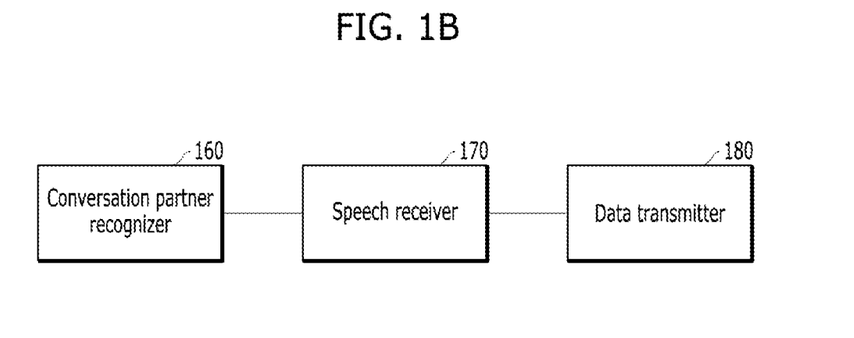
FIG. 1B is a block diagram of a system for supporting a multi-conversation mode for a vehicle according to an embodiment of the present disclosure.

FIG. 1B is a block diagram of a system for supporting a multi-conversation mode for a vehicle according to an embodiment of the present disclosure.

Referring to FIG. 1B, the system for supporting the multi-conversation mode for a vehicle may include a conversation partner recognizer 160, a speech receiver 170, and a data transmitter 180.

The conversation partner recognizer 160 may determine a space that a driver faces in order to have a conversation with a user, from among spaces allocated by the speech direction allocator 130, through a camera. When the direction of the driver's face is consistent with directivity of speech, the conversation partner recognizer 160 may recognize a conversation partner corresponding to the sound space corresponding to the speech. In one example, the direction of the driver's face being consistent with directivity of speech may mean that the driver's face faces the sound space corresponding to the speech.

Accordingly, the conversation partner recognizer 160 can recognize the conversation partner of the driver among messenger application users through the camera.

The speech receiver 170 may receive speech of the driver when the driver outputs the speech to the conversation partner. In one example, the speech receiver 170 may include a microphone configured to receive voice data and convert the voice data to a message or speech. In one example, the message or speech, after conversion by the speech receiver 170, may be in a form of text.

The data transmitter 180 may confirm the conversation partner through the conversation partner recognizer 160 and the speech receiver 170. Here, the data transmitter 180 may optionally check whether the selected conversation partner is correct.

The data transmitter 180 may transmit a message or speech of the driver to the confirmed conversation partner. In one example, the data transmitter 180 may include an antenna or a transceiver configured to perform wireless/wired communication to transmit data to a server or an external device such as a mobile device including a mobile phone.

Figure 2:
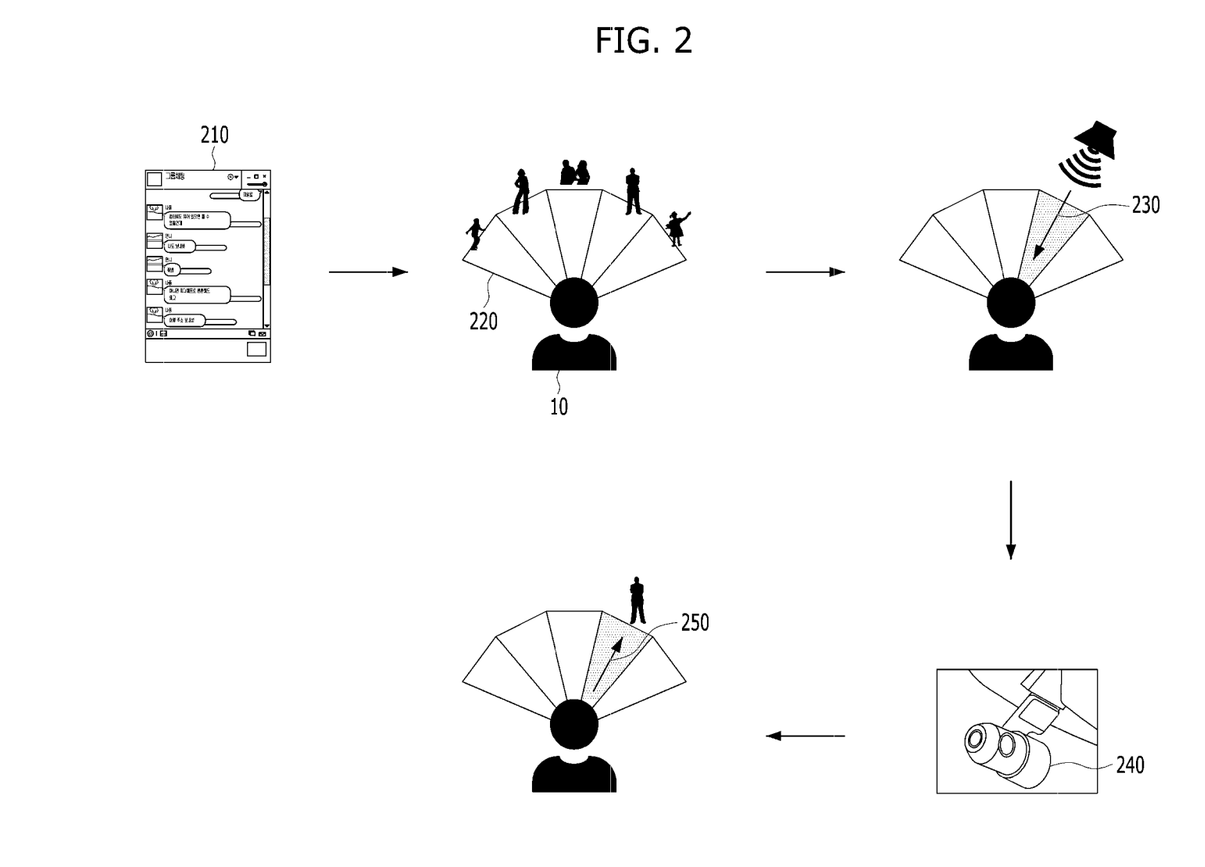
FIG. 2 is a diagram illustrating an example of a method for supporting a multi-conversation mode using directivity of sound according to an embodiment of the present disclosure.

FIG. 2 is a diagram illustrating an example of a method for supporting the multi-conversation mode using directivity of sound according to an embodiment of the present disclosure.

Referring to FIG. 2, the data receiver 110 may receive information on users participating in the multi-conversation mode or a chat room from a messenger application 210.

The speech direction allocator 130 may allocate sound spaces 220 on the basis of the user information. The speech direction allocator 130 may allocate the sound spaces 220 in response to the number of conversation partners included in the user information.

Although five sound spaces 220 in a fan shape are allocated based on a driver 10 and a conversation partner is allocated to each space in this figure, the shape of the sound space 220 and the number of sound spaces 220 are not limited thereto.

When the number of conversation partners is greater than the number of allocated spaces, the speech direction allocator 130 may group conversation partners on the basis of user information received from the user classifier 120 and allocate the group to a sound space 220.

Although two conversation partners are grouped on the basis of user information and this group is allocated to one of the five allocated spaces in this figure, the number of groups and the number of conversation partners in a group are not limited thereto.

The speech output unit 150 may output speech to spaces allocated by the speech direction allocator 130 in response to messages and speech received from multiple users through the messenger application.

When sound is output to the inside of the vehicle, the speech output unit 150 may output sound having directivity 230 to a space allocated by the speech direction allocator 130. Here, the speech output unit 150 may output sound having the directivity 230 using a surround effect.

When a message is received from a conversation partner, the speech output unit 150 may assign directivity to speech corresponding to the received message and output the speech having directivity.

When many messages are simultaneously received, the speech output unit 150 may allocate a predetermined speech output time to each space allocated by the speech direction allocator 130 in order to output speech corresponding to the messages. According to an embodiment, the speech output unit 150 may allocate 3 seconds per allocated space.

The speech output unit 150 may control a speech output speed when the speech output unit cannot output speech to each allocated space within the predetermined speech output time. To this end, the speech output unit 150 may increase the speech output speed. When the speech output unit 150 cannot output speech even after the speech output speed is increased, the speech output unit 150 may simultaneously output speech to the sound spaces 220 in an overlapping manner.

If the speech output unit 150 cannot output speech to each allocated space within the predetermined speech output time, the speech output unit 150 may not output onomatopoeia, modifiers and the like of messages.

When the number of sentences of a message received from a single conversation partner is equal to or greater than a predetermined value, the speech output unit 150 may stop speech output after the lapse of the predetermined speech output time and output speech to another allocated space. Thereafter, the speech output unit 150 may continuously output the stopped message as speech when speech output to another allocated space ends. Here, the predetermined number of sentences of a message may be 2 or more.

When there are no messages from other conversation partners within a set time, the speech output unit 150 may extend speech output by the predetermined speech output time in the allocated space in which speech is currently output.

When telephone calls are executed through the multi-conversation mode, the speech output unit 150 may allocate sound spaces 220 corresponding to circuits participating in conversations and control speech to be output to the spaces allocated corresponding to the telephone call circuits.

Meanwhile, when telephone calls are executed through the multi-conversation mode, the speech output unit 150 may allocate sound spaces 200 to conversation partners of the telephone calls in advance, and when a call from a user corresponding to an allocated space is received, the speech output unit 150 may output a bell sound to the allocated space.

The conversation partner recognizer 160 may recognize a face direction 250 of the driver detected through a camera 240. The conversation partner recognizer 160 may determine whether the face direction 250 of the driver is consistent with the sound directivity 230 with respect to a space allocated by the speech direction allocator 130.

When the face direction 250 of the driver is consistent with the sound directivity 230, the conversation partner recognizer 160 may select a conversation partner corresponding to the space 220 corresponding to the sound directivity 230.

Then, the speech output unit 150 may output speech to the allocated space on the basis of the speech of the conversation partner selected through the conversation partner recognizer 160.

Figure 3:
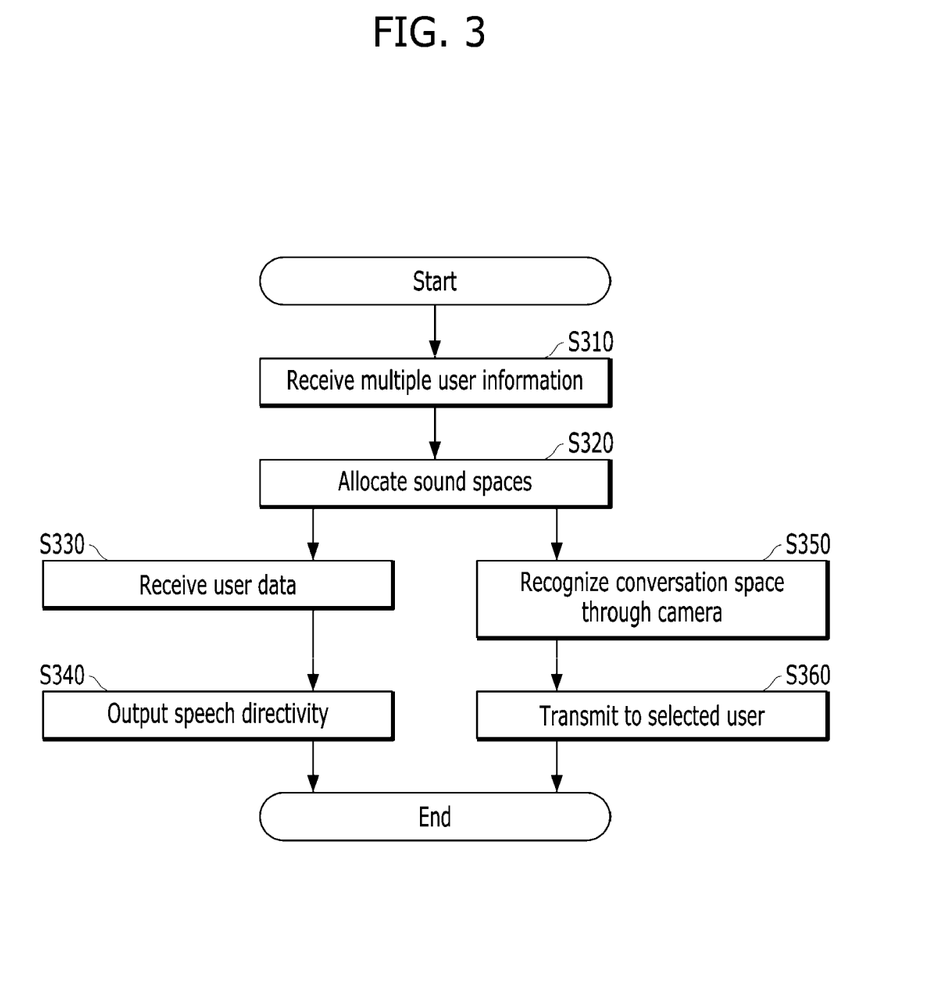
FIG. 3 is a flowchart of the method for supporting a multi-conversation mode according to an embodiment of the present disclosure.

FIG. 3 is a flowchart of a method for supporting the multi-conversation mode according to an embodiment of the present disclosure.

Referring to FIG. 3, the data receiver 110 may obtain information on users participating in the multi-conversation mode (S310).

After step S310, the speech direction allocator 130 may allocate sound spaces 200 in a vehicle on the basis of the obtained user information (S320). Here, when it is determined that the number of conversation partners of the multi-conversation mode is greater than the number of allocated spaces on the basis of the user information, the speech direction allocator 130 may group multi-conversation mode users and allocate the groups to allocated spaces on the basis of user classification information received from the user classifier 120.

After step S320, the data receiver 110 may receive messages or speech from conversation partners participating in the multi-conversation mode (S330).

After step S330, the speech output unit 150 may assign sound directivity 230 to a message or speech corresponding to each conversation partner and output the same as speech.

After step S320, when a driver speaks, the conversation partner recognizer 160 may recognize a direction in which the driver faces and has a conversation at a time when the driver speaks through a camera, and when the direction in which the driver faces and has a conversation corresponds to a space allocated by the speech direction allocator 130, the conversation partner recognizer 160 may select a conversation partner corresponding to the space (S350).

After step S350, the speech receiver 170 may receive speech of the driver and the data transmitter 180 may transmit a message or the speech of the driver to the selected conversation partner (S360).

Figure 4:
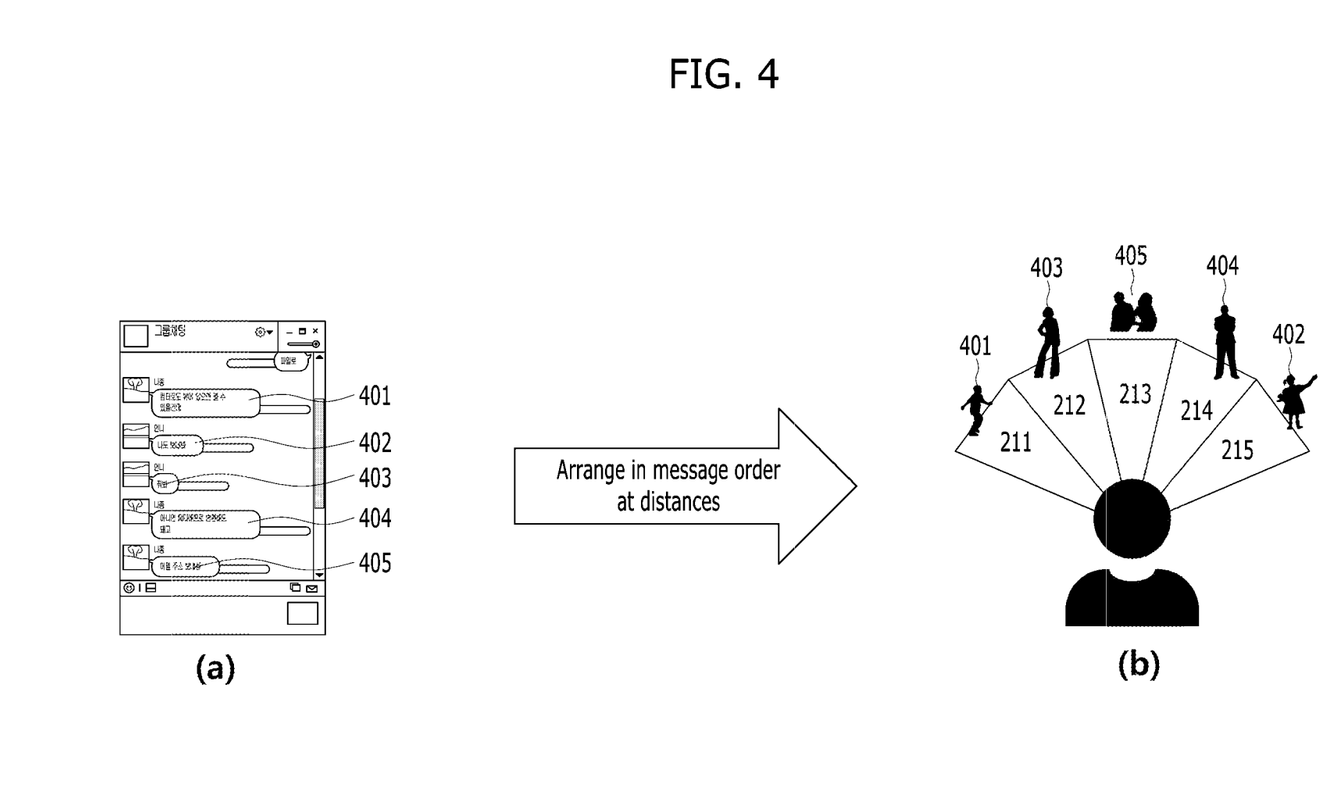
FIG. 4 is a diagram for describing a space allocation method using directivity of sound according to an embodiment of the present disclosure.

FIG. 4 is a diagram for describing a space allocation method using directivity of sound according to an embodiment of the present disclosure.

Referring to FIG. 4, the speech direction allocator 130 may allocate sound spaces 220 in the order of receiving messages in the multi-conversation mode when conversation partners are arranged in allocated spaces. Here, spaces may be allocated such that a conversation partner corresponding to a message is allocated to a farthest space from among the allocated spaces on the basis of the order of receiving messages so that the driver can easily recognize speech in the vehicle.

When first to fifth messages 401 to 405 are received in the multi-conversation mode, as illustrated in (a) in FIG. 4, the speech direction allocator 130 may arrange conversation partners in five allocated spaces 211 to 215 on the basis of the order of receiving the messages, as illustrated in (b) in FIG. 4.

The speech direction allocator 130 may arrange a conversation partner corresponding to the first message 401 in an edge space. In this figure, the conversation partner corresponding to the first message 401 can be arranged in the leftmost space 211.

The speech direction allocator 130 may arrange a conversation partner corresponding to the second message 402 in a space farthest away from the conversation partner corresponding to the first message 401. In this figure, the conversation partner corresponding to the second message 402 can be arranged in the rightmost space 215.

The speech direction allocator 130 may arrange a conversation partner corresponding to the third message 403 in a space farthest away from the conversation partner corresponding to the second message 402. In this figure, the conversation partner corresponding to the third message 403 can be arranged in a space 212 on the left of the center space.

The speech direction allocator 130 may arrange a conversation partner corresponding to the fourth message 404 in a space farthest away from the conversation partner corresponding to the third message 403. In this figure, the conversation partner corresponding to the fourth message 404 can be arranged in a space 214 on the right of the center space.

The speech direction allocator 130 may arrange a conversation partner corresponding to the fifth message 405 in a space farthest away from the conversation partner corresponding to the fourth message 404. In this figure, the conversation partner corresponding to the fifth message 405 can be arranged in the center space 213.

Figure 5:
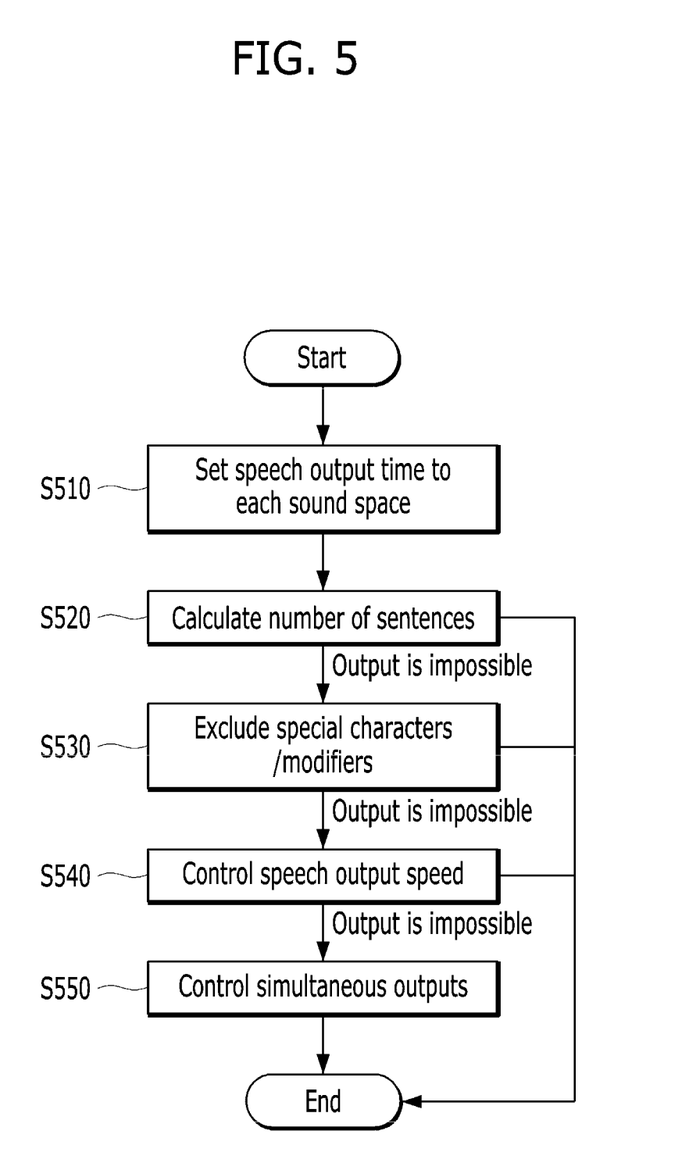
FIG. 5 is a diagram illustrating a voice output method in the method for supporting a multi-conversation mode according to an embodiment of the present disclosure.

FIG. 5 is a diagram illustrating a voice output method in the method for supporting a multi-conversation mode according to an embodiment of the present disclosure.

Referring to FIG. 5, the speech output unit 150 may set a predetermined speech output time to allocated spaces when many messages are simultaneously received (S510).

After step S510, the speech output unit 150 may determine whether speech corresponding to the received messages can be output within the predetermined speech output time, determine whether the number of sentences of the received messages is equal to or greater than a predetermined value when the speech cannot be output within the predetermined speech output time, and divide a speech output interval when the number of sentences is equal to or greater than the predetermined value (S520). Thereafter, the speech output unit 150 may output the messages when the speech can be output within the predetermined speech output time on the basis of the divided output intervals.

After step S520, when the speech cannot be output within the predetermined speech output time, the speech output unit 150 may exclude special characters, modifiers and the like from the messages, determine whether the messages from which the special characters, modifiers and the like have been excluded can be output as speech within the predetermined speech output time, and output the messages when they can be output within the predetermined speech output time (S530). Then, the speech output unit 150 outputs the messages from which the special characters, modifiers and the like have been excluded.

After step S530, the speech output unit 150 may control a speech output speed when the messages from which the special characters, modifiers and the like have been excluded cannot be output as speech within the predetermined output time (S540). Thereafter, the speech output unit 150 may increase the speech output speed to a predetermined speed and determine whether the speech can be output within the predetermined speech output time.

After step S540, when the speech output according to speech output speech control cannot be performed within the predetermined speech output time, the speech output unit 150 may perform control such that messages are simultaneously output to spaces in an overlapping manner (S550).

The above-described methods according to an embodiment can be implemented as programs executable in a computer and stored in a computer-readable recording medium such as a non-transitory computer readable recording medium. For example, the method or the operations performed by individual components including, but not limited to, the user classifier 120, the speech direction allocator 130, the speech modulator 140, and the conversation partner recognizer 160 can be embodied as computer readable code stored on a memory implemented by, for example, a computer readable recording medium such as a non-transitory computer readable recording medium. Examples of a computer-readable recording medium include a ROM, a RAM, a CD-ROM, a magnetic tape, a floppy disk, an optical data storage system, etc. A computer-readable recording medium may be distributed to a computer system connected via a network, computer-readable code can be saved and executed according to a distributed system. In addition, functional programs, code and code segments for realizing the above-described methods can be easily deduced by programmers skilled in the art. The system may include a computer, a processor, or a microprocessor. Alternatively, the user classifier 120, the speech direction allocator 130, the speech modulator 140, and the conversation partner recognizer 160, each, or together, may be implemented as a computer, a processor, or a microprocessor. When the computer, the processor, or the microprocessor reads and executes the computer readable code stored in the computer readable recording medium, the computer, the processor, or the microprocessor may be configured to perform the above-described operations/method.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method for supporting a multi-conversation mode for a vehicle, comprising:
    receiving user information from a plurality of conversation partners participating in the multi-conversation mode;
    receiving at least one of a message or speech from each of the plurality of conversation partners;
    allocating sound spaces on the basis of the user information; and
    assigning directivity to speech generated on the basis of at least one of the message or the speech and outputting the generated speech to an allocated space.

2. The method according to claim 1, wherein the user information includes at least one of the number, sexes, ages, IDs or names of the plurality of conversation partners.

3. The method according to claim 2, wherein the allocating of sound spaces on the basis of the user information comprises allocating sound spaces in response to the number of the plurality of conversation partners.

4. The method according to claim 3, further comprising:
    grouping the plurality of conversation partners on the basis of the user information when the number of the plurality of conversation partners is greater than the number of allocated spaces; and
    allocating the generated groups to the sound spaces.

5. The method according to claim 4, wherein the assigning of directivity to speech and outputting the speech to an allocated space comprises:
    arranging a conversation partner corresponding to the message in a farthest space from among the allocated spaces on the basis of message reception order; and
    assigning directivity to speech corresponding to the message received from the conversation partner and outputting the speech.

6. The method according to claim 5, wherein the assigning of directivity to speech corresponding to the message received from the conversation partner and outputting the speech comprises:
    setting a predetermined speech output time to the allocated spaces;
    determining whether output of the speech corresponding to the received message is within the predetermined speech output time;
    when speech output is not within the predetermined speech output time, excluding special characters and modifiers from the message and determining whether output of the message from which the special characters and modifiers have been excluded as speech is within the predetermined speech output time;
    when output of the message from which the special characters and modifiers have been excluded as speech is not within the predetermined speech output time, controlling a speech output speed such that the speech output speed becomes a predetermined value and determining whether speech output is within the predetermined speech output time; and
    when speech output according to the speech output speed control is not within the predetermined speech output time, controlling the message such that the message is output to sound spaces in an overlapping manner.

7. The method according to claim 6, wherein the determining of whether output of the speech corresponding to the received message is within the predetermined speech output time comprises determining whether the number of sentences of the received message is equal to or greater than a predetermined value when speech output is not within the predetermined speech output time, and dividing a speech output interval when the number of sentences is equal to or greater than the predetermined value.

8. The method according to claim 5, further comprising:
    determining a face direction of a driver through a camera at a time when the driver speaks;
    determining whether the face direction of the driver is consistent with the directivity of sound; and
    recognizing a conversation partner corresponding to the corresponding sound space when the face direction of the driver is consistent with the directivity of sound.

9. The method according to claim 8, further comprising:
    receiving speech of the driver when the driver speaks to the conversation partner;
    checking whether the conversation partner is correct; and
    transmitting a message or speech of the driver to the conversation partner.

10. A non-transitory computer-readable recording medium storing a program for realizing the method according to claim 1.

11. A system for supporting a multi-conversation mode for a vehicle, comprising:
    a data receiver for receiving user information from a plurality of conversation partners participating in the multi-conversation mode and receiving at least one of a message or speech from each of the plurality of conversation partners;
    a speech direction allocator for allocating sound spaces on the basis of the user information; and
    a speech output for assigning directivity to speech generated on the basis of at least one of the message or the speech and outputting the generated speech to an allocated space.

12. The system according to claim 11, wherein the user information includes at least one of the number, sexes, ages, IDs or names of the plurality of conversation partners.

13. The system according to claim 12, wherein the speech direction allocator allocates sound spaces in response to the number of the plurality of conversation partners.

14. The system according to claim 13, wherein the speech direction allocator groups the plurality of conversation partners on the basis of the user information when the number of the plurality of conversation partners is greater than the number of allocated spaces and allocates the generated groups to the sound spaces.

15. The system according to claim 14, wherein the speech output arranges a conversation partner corresponding to the message in a farthest space from among the allocated spaces on the basis of message reception order, assigns directivity to speech corresponding to the message received from the conversation partner and outputs the speech.

16. The system according to claim 15, wherein the speech output sets a predetermined speech output time to the allocated spaces, the speech output determines whether output of the speech corresponding to the received message is within the predetermined speech output time, when speech output is not within the predetermined speech output time, the speech output excludes special characters and modifiers from the message and determines whether output of the message from which the special characters and modifiers have been excluded as speech is within the predetermined speech output time, when output of the message from which the special characters and modifiers have been excluded as speech is not within the predetermined speech output time, the speech output controls a speech output speed such that the speech output speed becomes a predetermined value and determines whether speech output is within the predetermined speech output time, and when speech output according to the speech output speed control is not within the predetermined speech output time, the speech output controls the message such that the message is output to sound spaces in an overlapping manner.

17. The system according to claim 16, wherein the speech output determines whether the number of sentences of the received message is equal to or greater than a predetermined value when speech output is not within the predetermined speech output time, and divides a speech output interval when the number of sentences is equal to or greater than the predetermined value.

18. The system according to claim 15, further comprising a conversation partner recognizer for determining a face direction of a driver through a camera at a time when the driver speaks, determining whether the face direction of the driver is consistent with the directivity of sound, and recognizing a conversation partner corresponding to the corresponding sound space when the face direction of the driver is consistent with the directivity of sound.

19. The system according to claim 18, further comprising:
a speech receiver for receiving speech of the driver when the driver speaks to the conversation partner; and
a data transmitter for transmitting a message or speech of the driver to the conversation partner.

\* \* \* \* \*